Figure 1:
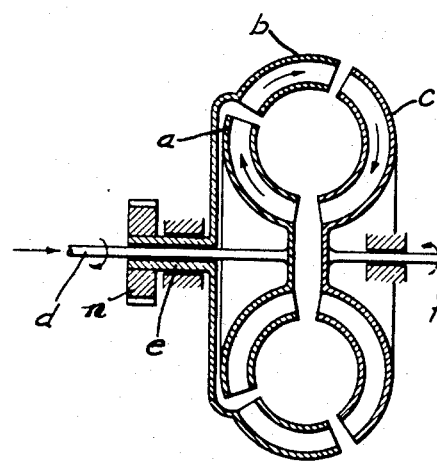

Jan. 24, 1939.                R. FICHTNER                 2,145,005
              HYDRAULIC TURBINE TORQUE CONVERTER
                      Filed Feb. 14, 1936

Inventor:
Rudolf Fichtner,
by Harry E. Dunham
His Attorney.

Patented Jan. 24, 1939

2,145,005

UNITED STATES PATENT OFFICE 2,145,005

HYDRAULIC TURBINE TORQUE CONVERTER

Rudolf Fichtner, Berlin, Germany, assignor to General Electric Company, a corporation of New York Application February 14, 1936, Serial No. 63,974
In Germany February 16, 1935

6 Claims. (Cl. 60—54)

The turbo torque converters known heretofore take up the difference between the input torque and the output torque by means of a guide-blade rim from which the said difference is transmitted to the casing. Said rim has an angular velocity of zero and thus does not contribute to the input or output of power. According to the present invention the guide-blade rim is used to deliver power, in that it is allowed to rotate in a direction counter to the direction of the usual rotating turbo member. The work thereby liberated may be transmitted to a separate shaft, or it may be transmitted to the main turbine shaft by means of a reversing gear.

In contradistinction to known machines of the type stated, the present improved machine is characterized by the feature that the fluid containing circuit of the torque converter consists of a rotary pump wheel and two rotatably mounted turbo wheels coaxially arranged with respect to each other and with respect to the pump wheel, the blades of the turbo wheels being so arranged that the turbo wheels rotate in opposite directions with respect to each other. While in the known types of torque converters the fluid circuit includes stationary guide rims or guide wheels it is possible according to the present invention to obtain an output torque which is different from the driving or input torque without the use of such stationary guide means in the turbo gearing. Within the torque converter itself the torques are always in equilibrium. The input torque $M_1$ is therefore equal to the difference between the output torques of the two oppositely rotating turbo wheels of the present invention, i. e., is equal to $M_2$—$M_3$. These output torques are opposite in direction but can be added for instance through the use of a reversing gear. There is therefore available for use $M_2$—$M_3$ which quantity can on principle be increased at liberty if the difference $M_2$—$M_3$ remains constant. The sum of the two output torques has its maximum value during very low speeds and thus gives the possibility of starting with greater torque than that of the usual torque converters in which only the output torque of one turbo wheel is available and in which the torque of the stationary guide wheel is taken up by the frame of the machine. The increased starting torque available in the torque converter of the present invention is of particular value in starting vehicles although it may be useful for various other purposes. With increasing speed the torque of the two turbo wheels will fall off rather quickly and in order to provide for sufficient torque during acceleration, if the torque converter is used for driving vehicles, it may be necessary to use other well known apparatus such as hydraulic torque converters with stationary guide wheels for further acceleration of the vehicle. It is however not necessary to provide such additional means since the hydraulic torque converter of the present invention may easily be converted into a torque converter of the usual type in which the guide wheel is stationary. For this purpose means may be provided to disconnect the counter-rotating turbo wheel and lock it against rotation, after starting the vehicle with driving connections between the two turbo wheels and their respective shafts.

The more the output torque is increased, the greater is the decrease in speed of the driven shaft. With a machine of high efficiency of the three-rim type (one pump wheel and two turbo wheels rotating counter to one another) transmission ratios can be obtained for which the known constructions would require at least four bladed members. The converter can also be built with a plurality of stages for either turbo wheel or for both.

The characteristics can be accommodated to widely different requirements by rendering the number of revolutions of the two turbo wheels independent of one another or by giving them any desired ratio relative to one another.

Converters designed according to the above-stated points of view also possess, like the known arrangements, the characteristic of having an automatic increase in the output torque when the speed of the turbo wheels decreases, and are, therefore, particularly suited for driving vehicles. In making use of the invention, for this purpose, any two axles or any two groups of axles can be driven without the undesired mechanical interconnection. Similarly to known machines, the present improved converter also has the advantage of giving an increased output torque when necessary over average requirements and, in addition thereto, of giving an automatic increase of torque when starting.

For a higher running speed the drive to several axles is frequently unnecessary and undesired. In such a case it is particularly favorable if, in any well known manner, one of the turbo wheels is disconnected from its corresponding vehicle axle and locked in position. There is then obtained for starting a two axle drive with great tractive power, and for higher speeds a one-axle drive with correspondingly reduced tractive power.

By suitably choosing the ratio of transmission in the mechanical gearing between the disconnectable shaft and the corresponding turbo wheel it is possible to increase the tractive power up to the limit established by the wheel-friction.

The more one increases the tractive power by this means, the quicker the tractive power decreases when the vehicle is started and comes up to speed. This is particularly desired with vehicles as, for instance, working vehicles for testing lines or switching locomotives which have to maintain a low but substantially uniform running speed even with widely varying tractive powers or running resistances.

By connecting the turbo-converter of the invention to a second turbo-converter of the same construction or to another turbo gearing an extended graduation of the transmission may be obtained for vehicle drives. Such combinations form the subject matter of my copending application Serial No. 63,975.

Figure 2:
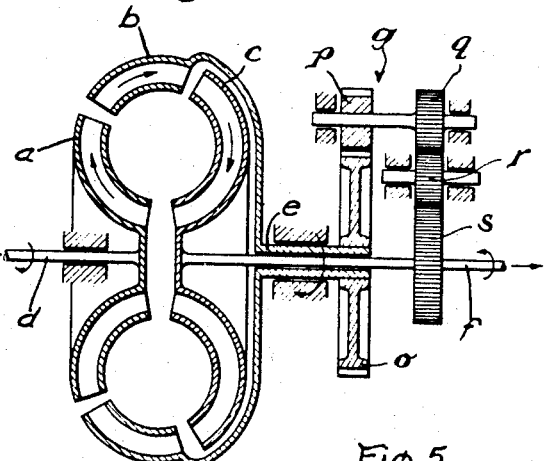
Figure 5:
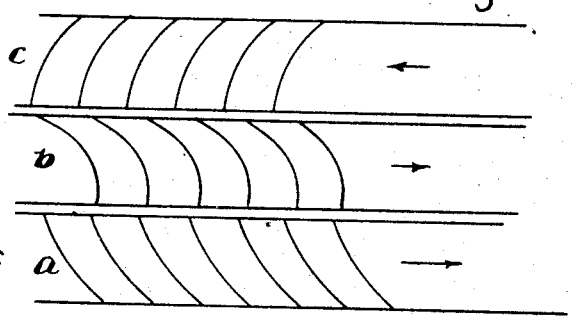
Figure 3:
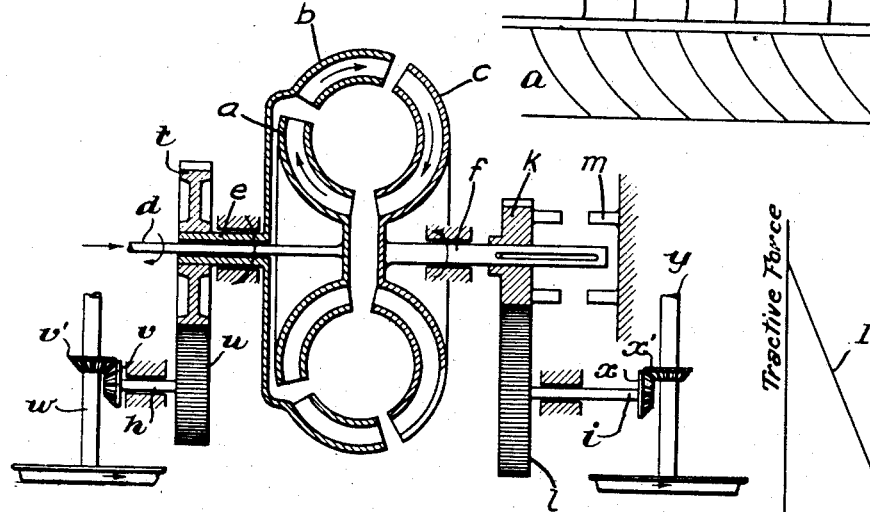
Figure 4:
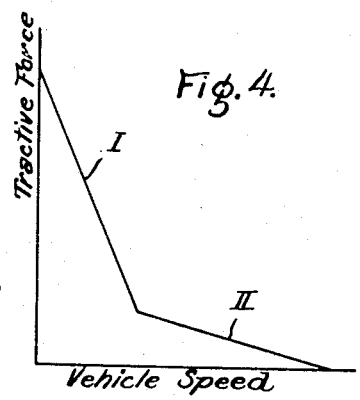

The invention is illustrated diagrammatically and by way of example in the accompanying drawing in which Figure 1 is an axial cross-section through a torque converter designed according to this invention. Figure 2 is a similar representation showing a modification. Figure 3 is likewise a representation similar to Figure 1 and shows another modification, and Figure 4 shows a diagram. Figure 5 is a diagrammatic illustration of the blading of the pump wheel and the turbo wheels.

In all the figures $a$ denotes a pump wheel, $b$ denotes a turbo wheel rotating in the same direction as said pump wheel, and $c$ denotes another turbo wheel running in a direction opposite to that of the wheels $a$ and $b$. The driving shaft of the machine is denoted by $d$. In Figure 1 the turbo wheel $b$ is connected to hollow shaft $e$ on which is mounted a gear $n$. The turbo wheel $c$ is connected to a shaft $f$. The wheels $b$ and $c$ thus drive the separate shafts $e$ and $f$.

In Figure 2 both of the wheels $b$ and $c$ drive the same shaft $f$. For this purpose the shaft $f$ is connected with the hollow shaft $e$ by means of a reversing gearing $g$, comprising gears $o$, $p$, $q$, $r$ and $s$.

In the operation of Figure 1, the fluid circulates in the turbo gearing as indicated by the arrows. When torque is applied to pump wheel $a$ through drive shaft $d$, turbo wheels $b$ and $c$ are caused to rotate due to the hydraulic coupling between the respective wheels. As is more easily seen from Figure 5 indicating the blading of the respective wheels, the turbo wheel $b$ rotates in the same direction as pump wheel $a$, while turbo wheel $c$ rotates in the opposite direction. Since turbo wheel $b$ is connected to hollow shaft $e$ and gear $n$, torque may be delivered through gear $n$ to any suitable apparatus, not shown. Turbo wheel $c$ is connected to driven shaft $f$ which likewise may be coupled to any suitable driven apparatus.

In Figure 2, the arrangement is somewhat different in that a gearing is provided for coupling driven shaft $e$ to driven shaft $f$. Since the turbo wheels $b$ and $c$ are rotating in opposite directions, it is necessary to couple these shafts through reversing gearing $g$, whereupon the torque from both of the turbo wheels $b$ and $c$ may be taken off through driven shaft $f$.

In Figure 3 the secondary shafts $e$ and $f$ are connected by means of gearing $t$, $u$ and $k$, $l$, respectively to the shafts $h$ and $i$. These shafts are connected to axles $w$ and $y$ of a vehicle through gears $v$, $v'$ and $x$, $x'$, respectively. The shaft $f$ may in this case be disconnected from the shaft $i$ and be locked in position. For this purpose the gear $k$ which is splined on shaft $f$ is shiftable so that it can be thrown in mesh with the gear $l$ on shaft $i$ or locked against rotation by stationary member $m$.

In the operation of Figure 3, the differential converter operates similarly to that shown in Figure 1, that is to say, torque is transmitted to the pump wheel $a$ through drive shaft $d$ which pump wheel $a$, in turn, drives turbo wheels $b$ and $c$. Turbo wheel $b$ rotates in the same direction as pump wheel $a$ and turbo wheel $c$ rotates in the opposite direction. The torque produced by turbo wheel $b$ is transmitted through hollow shaft $e$, gears $t$ and $u$ to shaft $h$ which, in turn, drives vehicle axle $w$ through intermediate gears $v$ and $v'$. The torque produced by turbo wheel $c$ is transmitted to shaft $f$. When gear $k$ is in its left hand position and thus in mesh with gear $l$, the turbo wheel $c$ drives shaft $i$ through gears $k$ and $l$ which shaft $i$, in turn, drives axle $y$ through intermediate gears $x$ and $x'$. This arrangement gives a high torque for starting and is particularly suited for vehicle drives in that torque is transmitted to two axles, i. e., four wheels. With gear $k$ moved to its right hand position, it is thrown into engagement with stationary member $m$ and locked against rotation. With this arrangement, the turbo wheel $c$ is also locked against rotation and the differential converter then operates as an ordinary torque converter wherein turbo wheel $c$ performs the function of a fixed guide wheel or rim and turbo wheel $b$ drives axle $w$ through shaft $e$, gears $t$ and $u$, shaft $h$ and intermediate gears $v$ and $v'$. Such an arrangement is particularly suited for driving a vehicle at higher speeds wherein extra large torques are not necessary.

The relationship which may be obtained between output torque and speed for the two stages of operation, is better demonstrated by reference to Figure 4 in which is shown a curve of the variation of the tractive forces with respect to speed. The portion I of the curve corresponds to the operation with turbo wheel $c$ coupled to shaft $i$ and the portion II of the curve corresponds to the operation with turbo wheel $c$ disconnected from shaft $i$ and locked against rotation.

I wish it to be understood that my invention should not be construed as limited to the particular constructional forms described and shown in the drawing but it is intended to cover all obvious modifications.

I claim:

1. A turbo torque converter comprising a fluid containing circuit which includes a rotary pump wheel and two rotatably mounted turbo wheels coaxially arranged with respect to each other and with respect to the pump wheel, the blades of said turbo wheels being so arranged that the said turbo wheels rotate in opposite directions and act as a guide wheel with respect to each other.

2. A turbo torque converter comprising a fluid containing circuit which includes a rotary pump wheel and two rotatably mounted turbo wheels coaxially arranged with respect to each other and with respect to the pump wheel, the blades of said turbo wheels being so arranged that the said turbo wheels rotate in opposite directions and act as a guide wheel with respect to each other, and driving connections between the said two turbo wheels and a rotatably mounted shaft including a reversing gear between one of said turbo wheels and said shaft.

3. A turbo torque converter comprising a fluid containing circuit which includes a rotary pump wheel and two rotatably mounted turbo wheels coaxially arranged with respect to each other and with respect to the pump wheel, the blades of said turbo wheels being so arranged that the said turbo wheels rotate in opposite directions and act as a guide wheel with respect to each other, two separate driven shafts and driving connections between each of said two turbo wheels and each of said two shafts respectively.

4. A turbo torque converter for vehicles with axles comprising a fluid containing circuit which includes a rotary pump wheel and two rotatably mounted turbo wheels coaxially arranged with respect to each other and with respect to the pump wheel, the blades of said turbo wheels being so arranged that the said turbo wheels rotate in opposite directions and act as a guide wheel with respect to each other, a driving connection between one of said turbo wheels and an axle of the vehicle and another driving connection between the other of said turbo wheels and another axle of the vehicle including means for causing said second axle to rotate in the same relative direction as said first axle.

5. A turbo torque converter for vehicles with axles comprising a fluid containing circuit which includes a rotary pump wheel and two rotatably mounted turbo wheels coaxially arranged with respect to each other and with respect to the pump wheel, the blades of said turbo wheels being so arranged that the said turbo wheels may rotate in opposite directions and act as a guide wheel with respect to each other, a driving connection between one of said turbo wheels and a vehicle axle, a driving connection between the other of said turbo wheels and another vehicle axle and means for disconnecting one of the turbo wheels from its corresponding driven axle and locking the same against rotation.

6. A turbo torque converter comprising a fluid containing circuit which includes a rotary pump wheel and two rotatably mounted turbo wheels coaxially arranged with respect to each other and with respect to the pump wheel, the blades of said turbo wheels being so arranged that the said turbo wheels may rotate in opposite directions and act as a guide wheel with respect to each other, two separate driven shafts, driving connections between each of said two turbo wheels and each of said two shafts respectively for starting said shafts with high torque and means for preventing the rotation of one of the turbo wheels for further accelerating the shaft connected to the other of said turbo wheels.

RUDOLF FICHTNER.